United States Patent [19]

Pöld et al.

[11] 4,166,949
[45] Sep. 4, 1979

[54] APPARATUS FOR IDENTIFYING AND REGISTERING BOTTLES

[75] Inventors: Jaan Pöld, Vällingby; Karl-Bertil W. Wettersten, Västerhaninge, both of Sweden

[73] Assignee: Hugin Kassaregister Aktiebolag, Stockholm, Sweden

[21] Appl. No.: 854,238

[22] Filed: Nov. 23, 1977

[30] Foreign Application Priority Data

Aug. 24, 1977 [SE] Sweden .......................... 7709515

[51] Int. Cl.² .............................................. G06M 7/00
[52] U.S. Cl. .................................................. 250/223 B
[58] Field of Search ..................... 250/223 B; 356/198, 356/240

[56] References Cited

U.S. PATENT DOCUMENTS

| 3,932,763 | 1/1976  | Weinstein | 250/223 B X |
| 3,955,179 | 5/1976  | Planke    | 250/223 B X |
| 4,055,834 | 10/1977 | Planke    | 250/223 B X |

FOREIGN PATENT DOCUMENTS 804161  11/1958  United Kingdom ................ 250/223 B Primary Examiner—James B. Mullins
Attorney, Agent, or Firm—Darby & Darby

[57] ABSTRACT

The invention refers to an apparatus of the type for automatic identification and registration of bottles of different sizes and/or shapes advanced one after the other along a path, at least some bottles having glass of a high light transparency. The bottles pass through the ray path of a light source-photocell arrangement forming a detector unit. According to the invention, the detector unit comprises a matrix having a universally and systematically grouped array of photo cells in the side and height directions of the bottles, each of said photo cells being actuable by a different and directed light ray from a point-shaped light source, and being, by means of a programming unit, programmable to respond in predetermined patterns, corresponding to the bottle types to be identified, a plurality of detecting operations being performed at points determined by the matrix while a bottle is advanced a certain distance.

10 Claims, 7 Drawing Figures

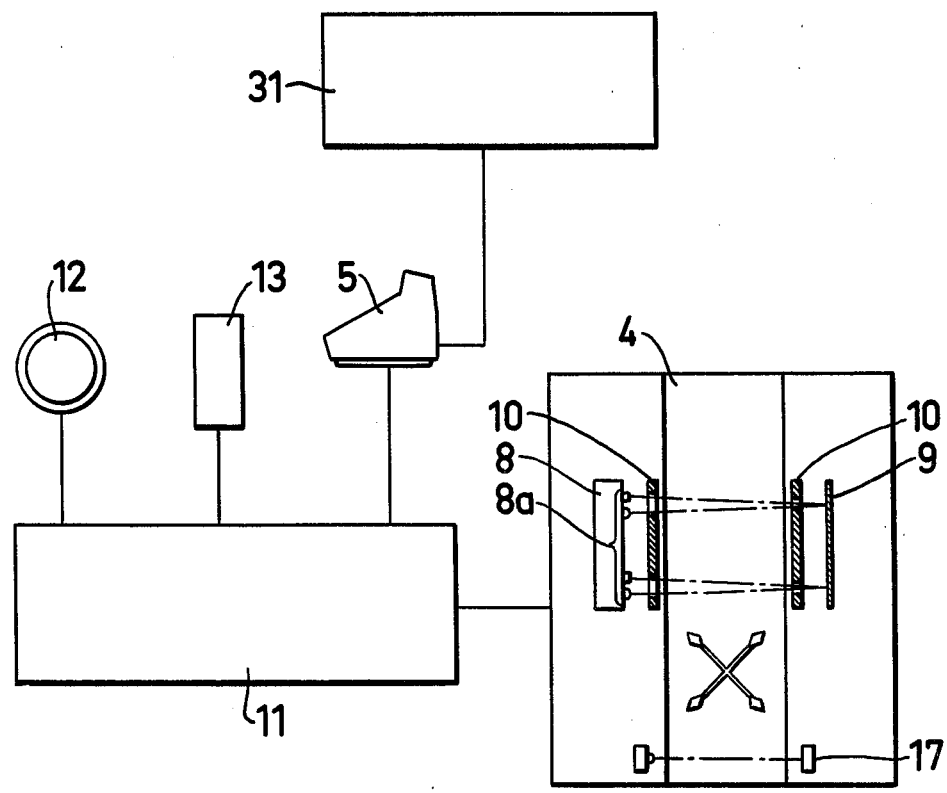
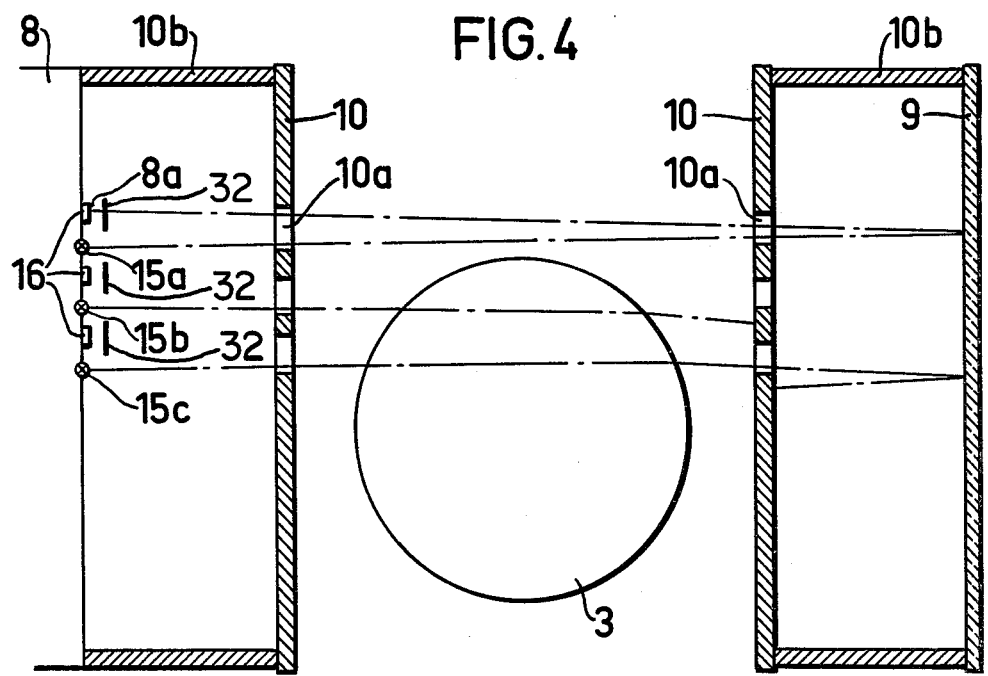

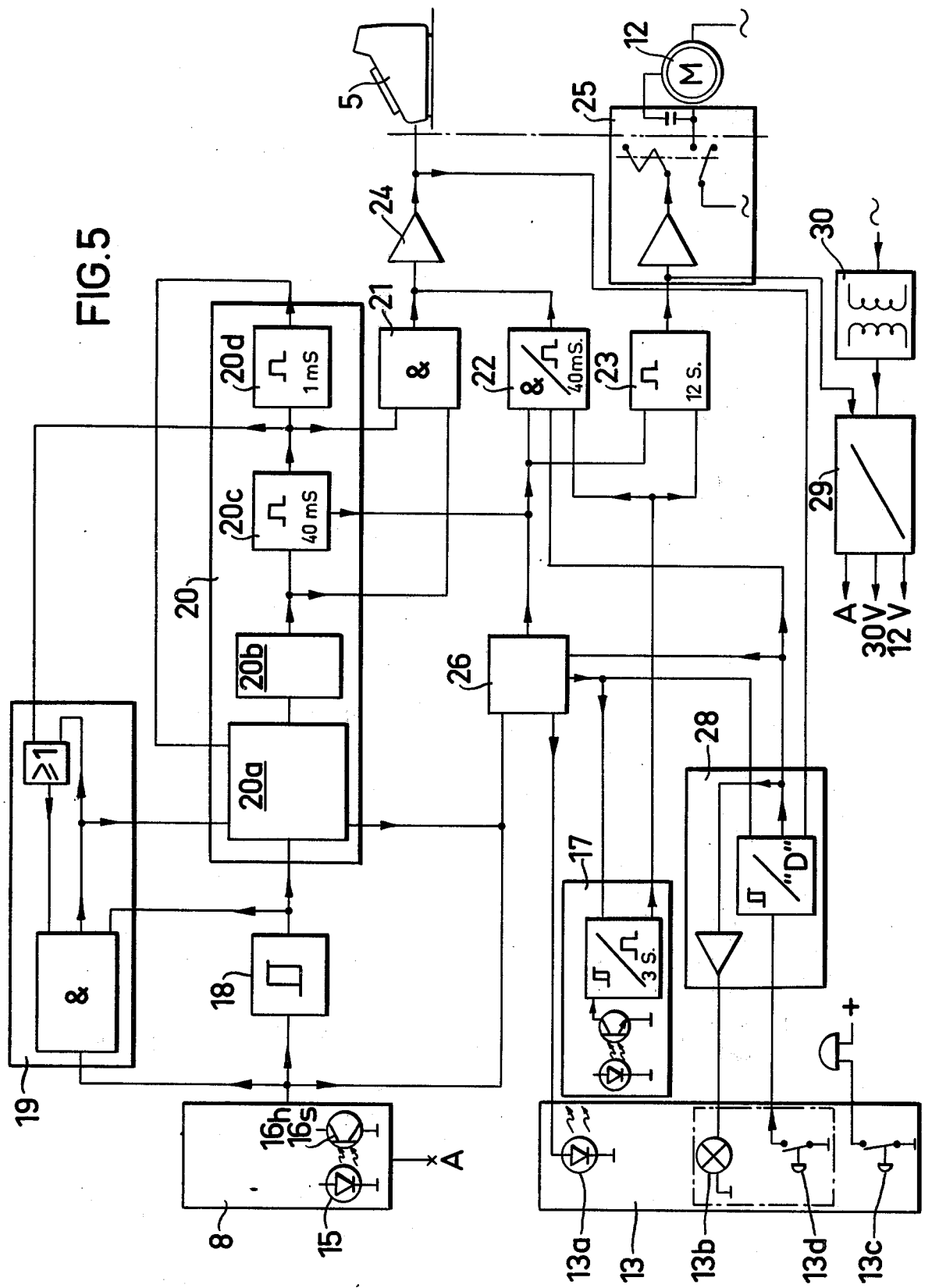

APPARATUS FOR IDENTIFYING AND REGISTERING BOTTLES

The present invention refers to an apparatus for automatic identification and registration of bottles of different sizes and/or shapes advanced one after the other along a path, among which bottles glasses of a high light transparency may be present, said bottles passing through the ray path of a light source-photocell arrangement forming a detector unit.

The purpose of the invention is to present a good solution to the following problems and demands related to automatic identification of bottles in shops, stores of the like, particularly empty bottles paid pawn for (so-called return glasses).

1. When there is a large assortment of bottles, different for different branches and, especially, emanating from different countries, many different forms of detector units are required, which obviously is not very practical.
2. One and the same apparatus should, therefore, be usable for different bottles and prices without a laborious adaption.
3. The apparatus should enable a sure identification even for a high light transparency of the glass of the bottle.
4. The apparatus must not be sensitive to light reflections.
5. It should be adaptable to conveyor belts already present.

From the Swedish Pat. No. 353,407 it is known to automatically identify different articles in a shop, e.g. bottles, measuring inter alia shape and then converting the measurement values into price informations.

Through the Swedish laid-out application No. 7216241-5 it is known, in a similar system, to identify bottles by detecting the light-shadow transition for a shadow image of the bottle by means of two photo transistors and converting the signal difference between the photo transistors into price information.

None of these two known arrangements, however, offers a complete solution to the above-mentioned problems and demands.

In the system according to said laid-out application No. 7216241-5 a principle is used for the measuring device, which is described in the U.S. Pat. No. 3,529,169 and operates with a single light source illuminating the whole bottle so that there is a possibility for both refracted and not refracted light rays to pass through the clear glass and act upon a photo transistor behind the bottle. For compensating this, said application prescribes a time delay which is slightly shorter than the passing time for the shadow of the bottle neck. Due to the movement direction of the bottle and the detection of the light-shadow transition, this measure is hardly applicable for measuring dimensions other than heights.

These limitations can be overcome and a complete solution to the problems and demands mentioned above be obtained by the arrangement of the invention, in accordance with which the detector unit comprises a matrix having an array of photo cells in the lateral and vertical direction, each of said photo cells being actuable by a different and directed light ray, and being, by means of a programming unit, programmable to respond in predetermined patterns, corresponding to the bottle types to be identified, a plurality of detecting operations being performed at points determined by said laterally and vertically arrayed photo cells while a bottle is advanced a certain distance.

Due to the principle of the invention with a narrow light ray for each photo transistor, preferably infra-red light, in which case the photo transistor is provided with a filter for filtering out other light, and preferably making the light ray pass twice across the detector tunnel by means of a mirror while placing a perforated shielding plate in front of both the mirror and the detector matrix, possibilities are given for a short-time detection of the shadowed photo transistors with no time delay. This fact, in its turn, makes possible the use of a universal detector matrix where a plurality of detecting operations are performed while the bottle is moving a certain distance. Programs for approving a bottle are established in connection with advancing a bottle of the particular type through the tunnel, and the datas obtained hereby from the matrix are stored in a memory.

For approvement of bottles having some occasional defect, such as a loose label corner which locally will disturb the contour line of the bottle, a certain error margin may be incorporated in the program at the comparison of detection signals with programs for bottles approved of.

In the following the invention will be described in further detail while referring to the accompanying drawings.

FIG. 2 is a block diagram of the apparatus;

FIG. 4 is a schematic representation of the function of the shield plate shown in FIG. 2;

FIG. 5 is the block diagram of a preferred embodiment of the electric equipment of the apparatus.

Figure 1:
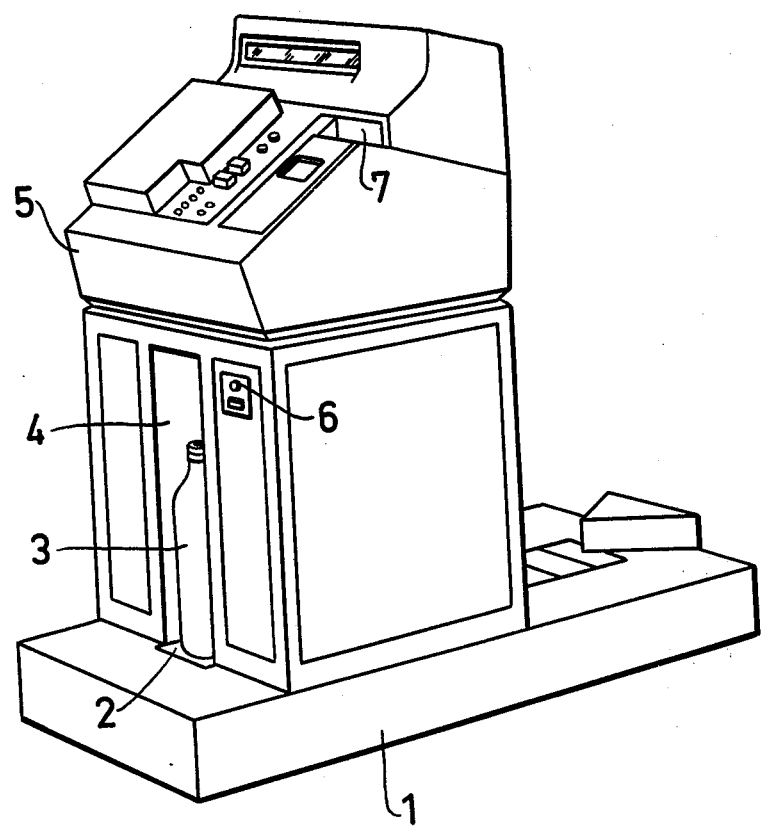
FIG. 1 is a perspective view of the exterior of the complete apparatus of the invention.

The apparatus shown in FIG. 1 is supported by a removable conveyor unit 1 the belt of which is indicated at 2. The belt advances bottles deposited on it through a tunnel 4, in both side walls of which a later described detector matrix and a mirror, respectively, are mounted to form the detector unit. On the top of the tunnel unit—which also houses the detector electronic equipment—a registering, programming and writing unit in the form of a cash register 5 is positioned in electrical connection with the tunnel electronic. By manipulating keys for approvement, price and rejection in the cash register, the operator can program the apparatus for predetermined bottle types and prices.

When the customer has put down his bottles 3 sequentially on the running belt 2 he presses the button 6 whereafter the pawn value for each inserted bottle, and the sum value, are printed on a ticket delivered in the box 7.

In FIG. 2 the apparatus is shown in a schematic block form. Again, there is shown the detector tunnel 4, having at its one side the detector matrix 8a and at its other side the mirror 9 and shielding and protection plates 10 described later. Further, there is a belt starter 17 operating with photo transistors. Of the electronic there is shown as a separate block 11 a micro processor coupled to a motor 12 for the conveyor belt, a control panel and said registering, programming and writing unit or cash register 5 which is connected to a shop computer system 31. Alternatively, the micro processor may be incorporated in the electronic equipment of the cash register. Further, at the entrance of the tunnel a turnstile 14 is positioned for separation of fed-in bottles so that they are properly spaced when passing through the tunnel.

Figure 3:
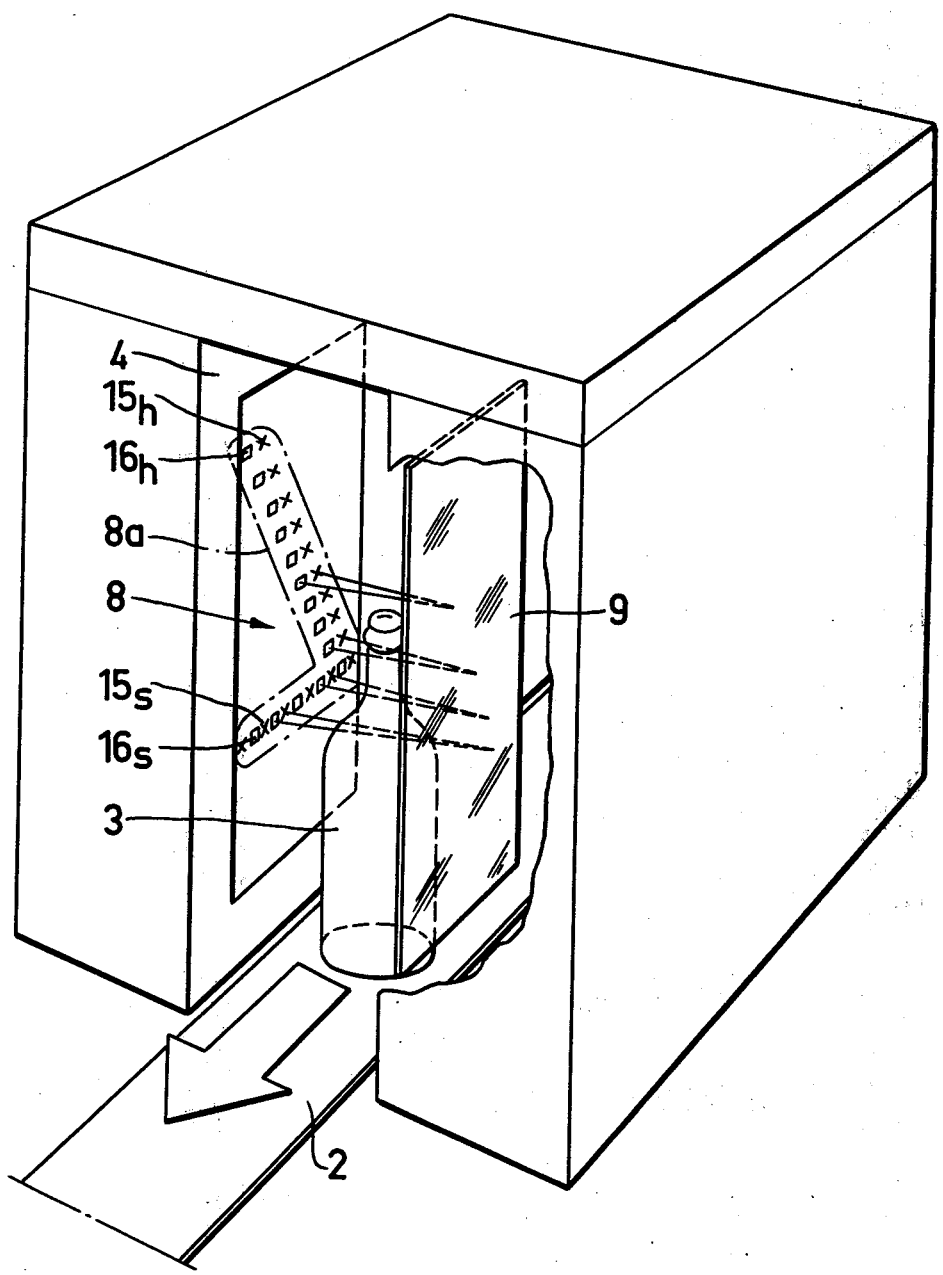
FIG. 3 is a schematic perspective view of the detector unit inclusive a mirror, housed in the detector tunnel.

In FIG. 3 there are again shown the conveyor belt 2, a bottle 3 and the tunnel 4 with its two side portions for carrying the detector unit 8 and its mirror 9, respectively. The bottle is, after passing the turnstile, on its way through the detecting section. In the case shown, the matrix 8a presents a horizontal and an inclined row of pairs of crosses 15 and squares 16 (the indices "s" and "h" indicate side and height direction, respectively), representing point-shaped light sources, as photo diodes, and photo transistors, respectively. The somewhat obliquely directed, narrow ray from each light source 15 is reflected by the mirror 9 with full intensity back to the photo transistor 16 associated with the light source when the ray passage is free so that the photo transistor delivers to the electronic a signal exceeding a predetermined treshold value. However, when a bottle enters the ray path, the reflected ray will—due to the refraction of the ray in the glass wall as described later—fall outside the photo transistor, the non-illuminated state of which is registered in the electronic and forms a step in the identification of the bottle type by means of the memory. In order to prevent the possibility that refracted rays may fall upon other adjacent photo transistors there are—as mentioned in connection with FIG. 2—according to FIG. 4 two shielding plates 10 provided, one in front of the mirror 9 and the other in front of the detector matrix 8a. Both plates are provided with small apertures 10a in the directed ray pathes from the respective light sources 15 (alternatively pairs of smaller apertures for the emitted and reflected ray, respectively) the size of the apertures being so restricted that refracted rays fall outside the aperture and, thus, are blocked as shown for the light source 15b in the Figure; on the other hand, non-refracted rays are reflected by the mirror 9, as intended, back to the phototransistor 16, as shown for the light source 15a.

For the light source 15c the light ray is blocked when it is going to pass through a shield plate for the third time.

Thus, if a refracted ray is to fall upon an adjacent photo transistor not associated to the proper light source it has to pass through apertures in the shielding arrangement not less than four times and has, moreover, to impinge exactly on said photo transistor. This presumed ray will, however, be so reduced in intensity by the four refracted paths through the glass of the bottle that the photo transistor will not be actuated. The safety against disturbing light reflexes is further increased by covering the detector matrix 8a and the mirror 9 with a housing 10b. When operating with infra-red light sources, associated filters 32 are positioned in front of each photo transistor 16, as shown in FIG. 4.

The operation of the electronic of the apparatus is explained below while referring to the schematic diagram shown in FIG. 5.

When a bottle is disposed on the conveyor belt it blocks the ray path to the photo transistor for the belt starter 17, so that a relay 25 is activated to start the belt motor 12 via a time delay circuit 23. After the same delay a current generator 29 is activated to "turn on" said photo diodes 15 via the output A. At the same time a checking device 26 performs a check of all photodiodes and photo transistors of the detector matrix 8a.

The sideways arrayed photo transistors $16_s$ deliver, when a bottle refracts the ray path, via a read gate 19 a conditional read-out pulse to a primary memory 20a in a central unit, generally indicated at 20. The shape detection criteria of the bottle from the photo transistors $16_h$ arrayed in the height direction of the matrix are delivered via a pulse improver 18. The read-out gate 19 cuts off the photo transistors $16_s$ and $16_h$ after that these have transmitted their criteria signals to the primary memory 20a. When predetermined program criteria regarding the configuration of the bottle are satisfied, signals corresponding to the pawn value of the bottle are transmitted from a price memory 20b, connected to the primary memory 20, to the cash register 5 via a time delay circuit 20c, an AND gate and an amplifier stage 24. The delay circuit 20d then resets the primary memory 20a. When all bottles are fed-in the contact 13d of the control panel (13 in FIG. 2) is closed to start the cash register for performing a totaling operation with ticket delivery via a bistable device 29, an AND gate 22 and the amplifier stage 24. If the last bottle has not yet passed the detector matrix 8a, the start of the cash register is delayed and a warning lamp 13b is energized. When a fault occurs in the detector matrix, flashes are produced by a light emitting diode 13a on the control panel via an astable device in the checking device 26. The customer can then call the operator by actuating a contact 13c of the panel; the resetting of said contact is made by means of a contact 13d on the pannel.

Figure 6B:
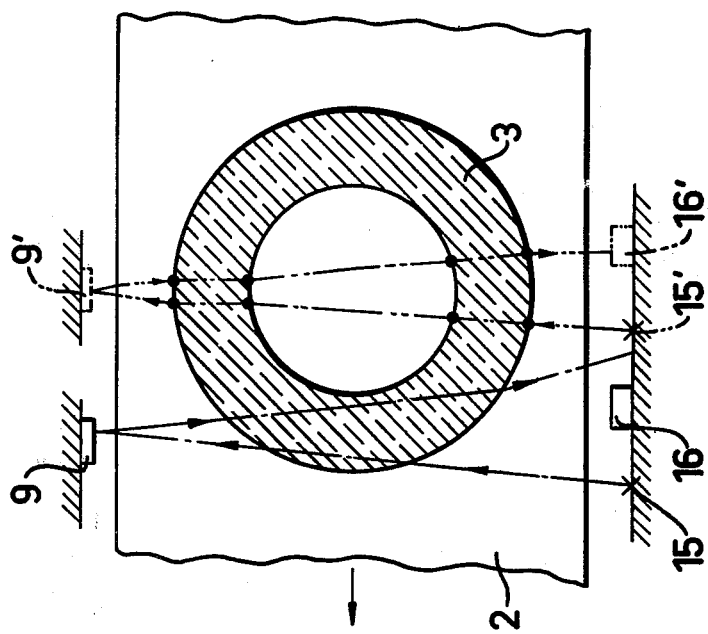
FIGS. 6a and 6b show the principle of the conventional detection and the detection preferred by the invention, respectively.
Figure 6A:
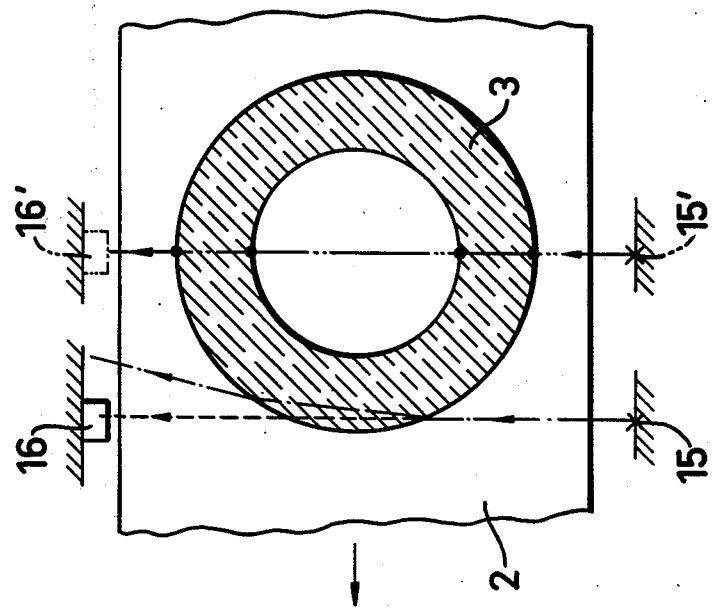

Finally, FIGS. 6a and 6b illustrate the advantages of the mirror system preferred in connection with the invention as compared with the conventional detecting system.

When using the conventional system in accordance with FIG. 6a, an empty, cylindrical bottle (3), of clear, coulorless glass, shown in transverse section, is advanced on the belt 2 in the direction of the arrow. For illustrative purposes the wall thickness of the bottle is greatly exaggerated. A light point source 15 at one side of the belt is provided for throwing its rays (dashed lines) towards a photo transistor 16 at the other side of the belt; the photo transistor is supposed to operate with closed-circuit current.

When the bottle is detected at its periphery by means of the photo transistor (rays indicated by dash-and-single dot lines) there occurs a double refraction of the ray so that it will fall outside the photo transistor 16 (as in the Figure) so that the indicating circuit will be activated. However, when the centre axis of a bottle of any type approaches the position opposite the photo transistor (the new relative position of the ray being indicated by dash-and-double dot lines) the ray will pass straight through the empty bottle without being refracted. If the coulorless glass is clean and clear, there will appear only relatively low reflection losses; i.e. the indicating circuit will consider the ray to be non-blocked and will behave correspondingly.

In FIG. 6b according to the invention, the photo transistor 16 has been positioned beside the light source 15, and a mirror 9 is provided at the opposite side of the belt 2 to reflect the correspondingly obliquely transmitted light ray towards the photo transistor 16. Contrary to the conditions shown in FIG. 6, there will be a quadruple refraction still more securing the indication. When the bottle reaches the previously critical position near its centre axes, the ray path 15'-9'-16' will be refracted in no less than eight points, the light losses of which combined with the now twice as much reflection losses, as compared with FIG. 6a, will make the indicating circuit correctly consider the photo transistor passed by the centre of the bottle as being still non-illuminated.

Due to small irregularities in the glass, e.g. a longitudinal ridge along the parting line of the mould, unexpected ray refractions may occur when detecting takes place adjacent the periphery of the bottle so that the ray is refracted in such a manner that it will fall upon its associated photo transistor at the wrong time; this can hardly happen when using the mirror arrangement, far less in combination with the shielding plates.

The invention is not restricted to the embodiment described above, but several modifications of it are obvious to one skilled in the art, For example, the shielding plates for increasing the safe detection could be replaced by another arrangement such as replacing the single large mirror with a plurality of small mirrors, one for each photo transistor, the size of the mirrors being so chosen that rays, refracted by a bottle, will fall outside the mirrors. Further, if a certain fault ratio in the detection can be accepted, one or both of the shielding plates may be omitted; also the conventional manner of detection—normally with a single light passage—may be used. The pointshaped light sources on the detector matrix, here described as photo diodes, could be replaced by correspondingly located apertures in a plate illuminated uniformly from behind. The described electronic equipment may, of course, be modified in a plurality of ways, in accordance with the existing requirements and purposes. Finally, it is obvious that the photo transistors may be replaced by some other type of photo cells, e.g. the type generating current when illuminated.

What we claim is:

1. An apparatus for automatic identification and registration of bottles of different sizes and/or shapes advanced one after the other along a path, among which bottles of a high light transparency may be present, said bottles passing through the ray path of a light source-photocell arrangement forming a detector unit, the improvement being that the detector unit comprises a matrix having an array of photo cells in the lateral and in the vertical direction, each of said photo cells being actuable by a different and directed light ray, and being, by means of a programming unit, programmable to respond in predetermined patterns corresponding to the bottle types to be identified, a plurality of detecting operations being performed with respect to a pattern of light received by said laterally and vertically arrayed photo cells while a bottle is advanced a certain distance.

2. An apparatus according to claim 1, wherein the programming unit, preferably a cash register, is provided with approvement and price keys as well as a rejection key, for programming the particular type of bottle when it is passing the detector unit.

3. An apparatus according to claim 1, wherein the detector unit has its light sources and associated photo cells located at the same side of the path adjacent to each other and assembled to form a unit, a mirror being provided at the other side of the path for reflecting the light ray towards the photo cell.

4. An apparatus according to claim 1, wherein at least one perforated shielding plate is located between the light sources and the photo cells for passing only non-refracted light rays onto the respective photo cells.

5. An apparatus according to claim 3, wherein the detector matrix and the mirror are provided with a housing.

6. An apparatus according to claim 1, wherein as light source infra-red rays are used, in combination with a filter, positioned over the photo cell and only passing infra-red rays, whereby disturbing light from the environment is reduced to a minimum.

7. An apparatus according to claim 3, wherein each light source-photo cell pair is associated with a separate mirror element of such a size that only non-refracted light rays fall upon the respective mirror elements.

8. An apparatus according to claim 1, wherein the cash register is adapted to form a terminal for a controlling connection to a shop computer system which, along with other periodical reports, delivers a report of received return bottles as regards the number and type.

9. An apparatus according to claim 1, wherein it at its bottom has a separate conveyor belt unit forming the path for the bottles and being removable to enable a positioning of the apparatus over an already present conveyor belt.

10. An apparatus for automatic identification and registration of bottles of different sizes and/or shapes, among which bottles of a high light transparency may be present, comprising means for advancing the bottles serially along a path, a detector arrangement on one side of the path including an array of detector units arranged in a lateral and in a vertical direction with respect to the path, each detector unit including a light source element and a corresponding light detector element adjacent thereto, reflecting means on the other side of the path opposite the detector arrangement for reflecting light rays emanating from the light source elements back across the path to the corresponding light detector elements of the detector unit array, means for generating signals representative of a pattern of light received by the vertically and laterally arrayed detector units, and programmable means for assigning a value in response to a predetermined pattern of generated signals corresponding to a bottle type to be identified.

* * * * *